United States Patent
Cohen et al.

(10) Patent No.: US 10,817,511 B2
(45) Date of Patent: Oct. 27, 2020

(54) SEARCH DIMENSIONALITY EXPANSION

(71) Applicant: Intel Corporation, Santa Clara, CA (US)

(72) Inventors: Rafi Cohen, Modiin (IL); Dganit Lebedev, Petach Tikva (IL); Oded Vainas, Petah Tiqwa (IL)

(73) Assignee: Intel Corporation, Santa Clara, CA (US)

( * ) Notice: Subject to any disclaimer, the term of this patent is extended or adjusted under 35 U.S.C. 154(b) by 916 days.

(21) Appl. No.: 15/198,118

(22) Filed: Jun. 30, 2016

(65) Prior Publication Data
US 2018/0004807 A1    Jan. 4, 2018

(51) Int. Cl.
| | |
|---|---|
| *G06F 17/30* | (2006.01) |
| *G06F 16/2453* | (2019.01) |
| *G06F 16/29* | (2019.01) |
| *G06F 16/9535* | (2019.01) |
| *G06F 16/9537* | (2019.01) |

(52) U.S. Cl.
CPC ........ *G06F 16/24534* (2019.01); *G06F 16/29* (2019.01); *G06F 16/9535* (2019.01); *G06F 16/9537* (2019.01)

(58) Field of Classification Search
CPC . G06F 16/24534; G06F 16/9535; G06F 16/29
See application file for complete search history.

(56) References Cited

U.S. PATENT DOCUMENTS

| | | | |
|---|---|---|---|
| 5,961,645 A | 10/1999 | Baker | |
| 10,073,896 B2* | 9/2018 | Park | G06F 3/04817 |
| 2008/0005071 A1 | 1/2008 | Flake et al. | |
| 2010/0004004 A1* | 1/2010 | Browne-Swinburne | H04W 4/029 455/457 |
| 2010/0168994 A1* | 7/2010 | Bourque | G01C 21/3617 701/532 |
| 2011/0099180 A1* | 4/2011 | Arrasvuori | G01C 21/3679 707/754 |
| 2012/0109939 A1 | 5/2012 | Kravets | |
| 2012/0191492 A1 | 7/2012 | Diba | |
| 2012/0246155 A1 | 9/2012 | Vadlamani et al. | |

(Continued)

OTHER PUBLICATIONS

"International Application Serial No. PCT US2017 028634, International Search Report dated Jul. 26, 2017", 3 pgs.

(Continued)

*Primary Examiner* — Huawen A Peng
(74) *Attorney, Agent, or Firm* — Schwegman Lundberg & Woessner, P.A.

(57) ABSTRACT

System and techniques for search dimensionality expansion are described herein. A history of intelligent agent activity may be received. A search result generated by an external entity may be obtained that includes a set of geographic points of interest (POI). A geographic segment may be retrieved from a geographic segment library when the geographic segment contains a member of the set of POI. Here, the geographic segment defines a geographic area and a dimension set. The search result may be modified to create a modified search result that includes a member of the dimension set. The modified search result may then be transmitted to a user device.

24 Claims, 5 Drawing Sheets

(56) References Cited

U.S. PATENT DOCUMENTS

2012/0331420 A1 12/2012 Meyer et al.
2016/0132513 A1 5/2016 Lim et al.

OTHER PUBLICATIONS

"International Application Serial No. PCT US2017 028634, Written Opinion dated Jul. 26, 2017", 7 pgs.

Yin, Hongzhi, et al., "LCARS: A Location-Content-Aware Recommender System", Proceedings of the 19th ACM SIGKDD international conference on Knowledge discovery and data mining, (2013), 221-229.

Zheng, Yu, et al., "Chapter 9: Location-Based Social Networks: Locations", Computing with Spatial Trajectories, Springer, (2011), 277-308.

* cited by examiner

SEARCH DIMENSIONALITY EXPANSION

TECHNICAL FIELD

Embodiments described herein generally relate to search engines and more specifically to search dimensionality expansion.

BACKGROUND

Search engines are systems in which a user provides some search criteria that the engine interprets and uses to search a dataset in order to find results relevant to the provided criteria. Generally search engines include a mix of query processing (e.g., query expansion, query re-writing, etc.) and data organization (e.g., indexes, classifications, labeling, etc.) to provide search results. An aspect of some data warehousing data structures is a dimension. A dimension is generally a structure that categorizes facts or measures in order to enable users to answer specific questions. That is, dimensions provide structured labeling to otherwise unordered numeric measures in the context of particular queries. Generally a dimension is a data set composed of individual, non-overlapping data elements.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Today, there are search engines and applications that help one to find a place or point of interest (POI), such as a restaurant, hotel, resort, café, bar, etc. Current POI searching systems allow users to search by a category (e.g., eatery, hardware store, etc.), near or within a city, state, or country, or by a specific address (e.g., a mailing address). Often, the results returned by these engines contain rich information about the POI, such as user reviews, ratings, prices, quality, pictures, etc. However, these engines are of limited use when information of a surrounding area, or deeper area information is desired. Users may want to find a hotel or restaurant not simply based on the particular POI, but on an environmental characteristic—such as whether it is an urban, suburban, or rural area—demographics (e.g., population age), how crowded the area is, or other places or events in the area. For example, a user may wish to "book a hotel in a museum district."

To achieve the area aware searching users typically have to execute a POI search and then perform additional searches, using different providers, to gather the additional area data. This process may be time consuming and difficult to perform on interface limited devices such as via phones, tablets, or the like. To address these issues, a system may collect area data and segment it by geographic regions. The area data may be added to external POI search results to add dimensionality to those search results, thus modifying the search results. This additional dimensionality may be exposed to the user to enhance query flexibility. Because the external providers, and their data, are outside the control of the system, using the geographic segmentation provides a universal interface to modify their results without changing the underlying operation of their search engines. Thus, the increased dimensionality, leading to a more powerful search apparatus, helps users without requiring costly collaboration or data manipulation with a current search ecosystem.

Figure 1:
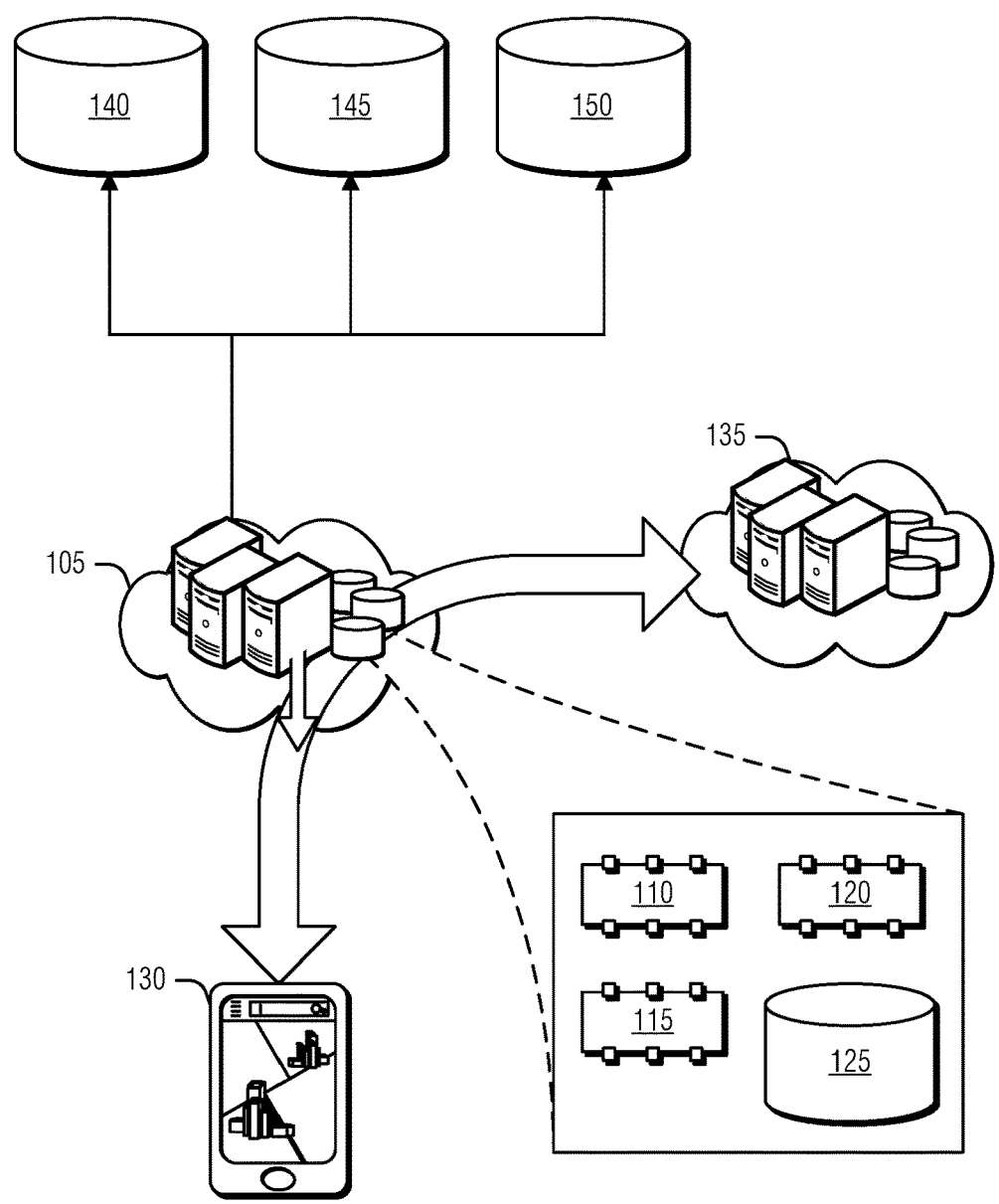
FIG. 1 is a block diagram of an example of an environment including a system for search dimensionality expansion, according to an embodiment.

FIG. 1 is a block diagram of an example of an environment 100 including a system 105 for search dimensionality expansion, according to an embodiment. The system 105 includes a transceiver 110, a search engine 120, and an integrator 115. These components of the system 105 are implemented in computer hardware, such as a processor, FPGA, or circuitry, as described below, for example, with respect to FIGS. 4 and 5.

The transceiver 110 is arranged to interface with a network, such as a wired (e.g., Ethernet) or wireless (e.g., IEEE 802.11, 3GPP family of cellular standards, etc.). The transceiver 110 is also arranged to obtain (e.g., retrieve or receive) a search result generated by an external entity 135. As used herein, an external entity 135 is a provider, service, or other system capable of providing search results and not under the control of the system 105. That is, the system 105 has only a query interface available to it with respect to the external entity 135. The search results returned from the external entity 135 include a set of POI. These POI are geographic in that each has an associated geographic coordinate.

The transceiver 110 is also arranged to transmit a modified search result to the user device 130. The modified search result is the product of the search engine 120 and integrator 115 discussed below.

The search engine 120 is arranged to retrieve a geographic segment from a geographic segment library 125. A geographic segment defines a geographic area, such as a two or three dimensional manifold applied to an area of the Earth. The geographic segment also defines a dimension set, or a set of dimensions that apply to the geographic area of the segment. In an example, the dimension set has a cardinality of one. That is, each segment corresponds to a single dimension applied to the geographic area. In an example, two geographic segments overlap in geographic area. The search engine 120 is arranged to retrieve geographic segments into whose geographic area POI in the search result are found.

In an example, a member of the dimension set is a pollution index. In an example, a member of the dimension set is a crime index. In an example, a member of the dimension set is a population density. In an example, a member of the dimension set is an injury rate. In an example, a member of the dimension set is a noise index. In an example, a member of the dimension set is a POI density. In an example, a member of the dimension set is a POI type density. POI type density differs from POI density by the threshold similarity applied in tabulating the constituent parts. For example, one may ask for a POI of "Jimmy's Bar" and a POI type of "bar." In an example, a member of the dimension set is a population demographic. Such demographics may include concentrations or rations, such as by age, gender, religious affiliation, sport team affiliation of support, etc. In an example, a member of the dimension set is limited to a single value, such as a count or ratio. This single value may be tested against a user filter to yield a simple yes-or-no answer as to whether the dimension will exclude a POI. In an example, a member of the dimension set include a positional proposition. For example, "outside Minneapolis" is a positional proposition.

The integrator 115 is arranged to modify the search result from the transceiver 110 with a member of the dimension set found by the search engine 120. In an example, the integrator 115 is arranged to modify the search results by creating a relationship entry between the search result and the geographic area. This may improve data compactness by avoiding redundant application of the dimensionality criteria. Thus, a foreign key is used to reference the dimensions rather than copying the dimensions into every search result data structure. In an example, the integrator 115 may be arranged to create a relationship entry for each member of the dimension set and the search result. This type of denormalized relationship may be beneficial when, for example, the dimension data is sparse but the geographic segment data is large. Further, performance improvements may be achieved by avoid dereferencing when obtaining pertinent dimension data.

Implementing the system 105 as described above results in an operation where the initial POI query results are received from the external entity 135 via the transceiver 110. The returned POI are used by the search engine 120 to find pertinent geographic segments from the segment library 125. Dimension sets are obtained from the found geographic segments, providing dimensions applicable to the returned POI. These dimensions are then added to the returned POI results, expanding the dimensionality of the search results.

The system 105 may be further extended to support a rich user experience. For example, the transceiver 110 may be arranged to transmit a search interface to the user device 130. The transceiver 110 may also be arranged to receive query parameters from the search interface. These query parameters are selected based on user interactions with the search interface. The selection may be simply adopting a keyword, phrase, images, etc. provided by the user. However, the selection may be derived from the user input, such as provided a date object when the user simply specifies "tomorrow." In an example, the query parameters include an identifier of the external entity 135. For example, the user may enter the external entity's address in the user interface. In an example, the search interface includes a recommendation for the external entity 135. In an example, the recommendation is based on prior user interactions with the search interface. For example, if three external entities have previously been used to provide search results and the user consistently does not investigate (e.g., click on) the second external entity's results, the external entity will not be recommended to the user. Additional criteria may include user interests (e.g., sports team affiliation) and external entities that satisfy other users with similar interests.

In an example, the query parameters include a dimension selector. The dimension selector indicates which dimensions the user wishes to use in filtering the search results. In an example, the dimension selector includes a valence. For example, if the dimension is a noise index, the valence indicates whether being over or under the noise index indicates that the search result should be retained. Thus, in an example, when a search result does not conform to the dimension selector (including valence when available) the integrator 115 is arranged to remove nonconforming search results when creating the modified search results.

In an example, the search engine 120 is to limit its search to segments that have a dimension set member that conforms to the dimension selector. In this example, the search engine efficiency may be increased as it is generally more efficient to index a dimension than determine whether a POI is within a geographic area. Thus, only relevant geographic segments are tested to determine whether or not they contain a POI in the search results.

Additionally, the transceiver 110 is arranged to transmit external query parameters, which are based on the received query parameters, to the external entity 135. In this way, the system 105 controls the user's experience while still leveraging the capabilities of the external entity 135. In an example, the external query parameters are the same as the query parameters with elements specific to the system 105, such as the dimension selector, removed. In an example, the external query parameters are a transformation of the query parameters, so as to perform query expansion, translate to a different language, etc.

Although the geographic segment library 125 may be pre-set, or informed by an offline process, in an example, the system 105 is extended to populate the geographic segments or provide for their updating. Thus, the transceiver 110 is arranged to obtain a source host definition including a corresponding dimension set. The transceiver 110 is also arranged to transmit, periodically, a source query to a host (e.g., host 140, 145, or 150) identified by the source host definition. For example, if host 140 is a law enforcement database, it may be indicated in a dimension set for crime statistics. The transceiver 110 contacts the host 145, perhaps on a monthly basis, to update updated crime statistics for one or more geographic areas. These updates, or initial findings, are stored in the library 125 for future use as geographic segments. Hosts may include government databases (e.g., for census, population, or other demographic information), weather databases, event databases (e.g., from ticket companies), among others.

To augment official sources such as the hosts 140, 145, or 150, user provided input, in the form of review or recommendations may also be used. Topic extraction may be applied to the review or recommendations to extract one or more dimensions from the raw materials. Similarly, geographic area information may be extracted from the source material, or from metadata of that materials. In this way, an additional and perhaps more insightful source of the dimension set and geographic area, and thus geographic segmentation, may be found.

Figure 2:
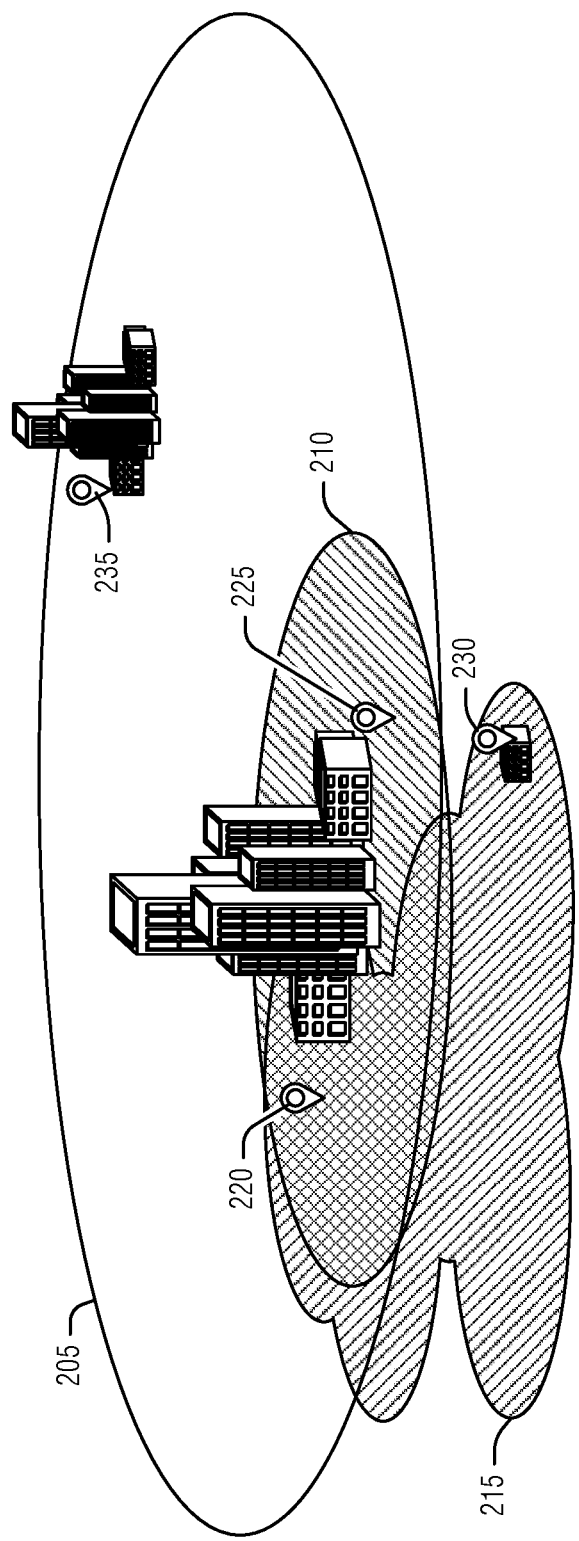
FIG. 2 illustrates an example collection of geographic segments and points of interest (POI), according to an embodiment.

FIG. 2 illustrates an example collection 200 of geographic segments and points of interest (POI), according to an embodiment. The geographic segments include a metropolitan area 205, a city 210, and a high-crime area 215. The POI type is "bars," the collection 200 including the bars 220, 225, 230, and 235, which were returned by an external provider in response to a query like "bars near me," when the user is in the city 210. The geographic segment 215 permits the added proposition "with low crime"). Thus, when the dimension of high-crime is added to POI 220 and 230, the "with low crime" proposition may be honored to exclude these POI from the search results. Similarly, the dimension for being within the city 210 added to POI search results 220 and 225 allows the proposition "outside of the city" to be honored, resulting in the culling of POI 220 and 225 from the POI search results returned to the user device. Propositions may be cumulative. Thus, for example, the result of the query "bars near me with low crime and outside of the city" would result in POI 235 being returned, the other POI including a dimension that does not conform to a dimension selector (as expressed in the proposition).

Figure 3:
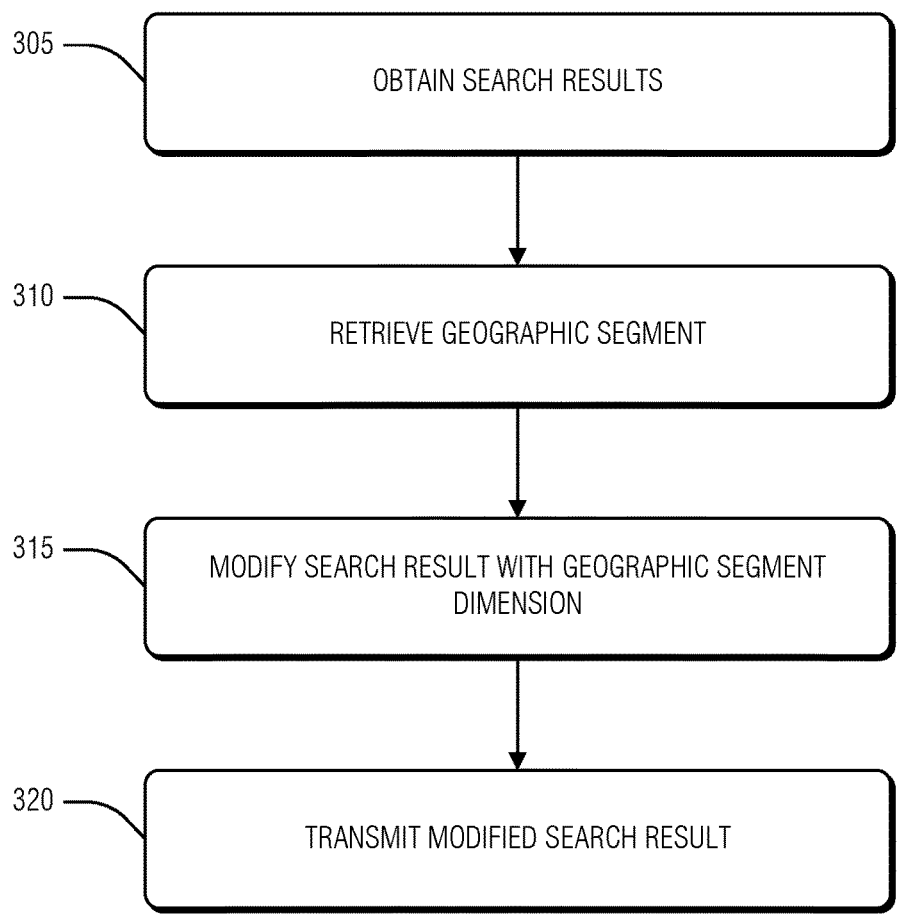
FIG. 3 illustrates a flow diagram of an example of a method for search dimensionality expansion, according to an embodiment.

FIG. 3 illustrates a flow diagram of an example of a method 300 for search dimensionality expansion, according to an embodiment.

At operation 305, a search result generated by an external entity is obtained. Here, the search result includes a set of geographic POI.

At operation 310, a geographic segment is retrieved from a geographic segment library. The geographic segment contains a member of the set of POI and also defines a geographic area and a dimension set. In an example, members of the dimension set include a pollution index. In an example, members of the dimension set include a crime index. In an example, members of the dimension set include a population density. In an example, members of the dimension set include an injury rate. In an example, members of the dimension set include a noise index. In an example, members of the dimension set include a POI density. In an example, members of the dimension set include a population demographic. In an example, at least one member of the dimension set includes a positional proposition.

At operation 315, the search result is modified to create a modified search result that includes a member of the dimension set. In an example, modifying the search result includes creating a relationship entry between the search result and the geographic area. In an example, the relationship entry is for each member of the dimension set and the search result.

At operation 320, the modified search result is transmitted to a user device.

The operations of the method 300 may be expanded to include transmitting a search interface to the user device. In an example, the search interface includes a recommendation for an external entity (to provide the search results) based on prior user interactions with the search interface.

The operations of the method 300 may be expanded to include receiving query parameters from the search interface. Here, the query parameters are selected based on user interactions with the search interface (e.g., the user entered the parameters). In an example, the query parameters include an identifier for the external entity. In an example, the query parameters include a dimension selector.

The operations of the method 300 may be expanded to include parsing the query parameters to create external query parameters.

The operations of the method 300 may be expanded to include transmitting the external query parameters to the external entity.

In an example, searching the geographic segment library includes limiting the search to geographic segments that have a dimension set member that conforms to the dimension selector. In an example, modifying the search result includes removing the member of the set of POI when the dimension set does not conform to the dimension selector.

The operations of the method 300 may be expanded to include obtaining a source host definition including a corresponding dimension set.

The operations of the method 300 may be expanded to include transmitting, periodically, a source query to a host identified by the source host definition.

The operations of the method 300 may be expanded to include storing a result from the source query in the dimension set for the geographic segment. In an example, the query result includes reviews within the geographic segment. In this example, the operations of the method 300 may be expanded to include performing topic extraction on the reviews to create a topic set and adding members of the topic set to the dimension set.

Additional details or examples of the material presented above may include a system and method for a contextual search engine that adds information about a surrounding areas from different sources, creates indices from keywords inside the data, creates homogenous classified areas, and uses these to support new filters that the user may use. Example sources that may be used for the classified areas include a land use algorithm, POI information from POI providers, or textual information from user reviews or recommendations. The land use algorithm, may take account of spatial data with environmental information layers. These layers may include surface polygons or shapes, buildings, use classification (e.g., agricultural, commercial, residential, etc.), weather (e.g., historic, forecast, etc.), crime, air pollution, etc.

Upon user request, third-party (e.g., external) search engines provide a POI search result. Thus, a query such as "hotels in London," or "bars in New York," will return a list of conforming POI. This list is filtered by user selections of homogenous area classification dimensions. As noted, multiple classifications may be simultaneously applied. For example, the user may filter by stating something akin to "quiet, clean, beach strip, away from the city," or "tourist center with local restaurants and pubs." Such natural queries may be enabled by maintain area dimensions (e.g., clean, quiet, urban, etc.), parsing propositions to determine whether the filter is positive (e.g., keep conforming results) or negative (e.g., remove conforming results), and the target POI (obtained from the external entity). Aspects of these parameters may also be improved over time by weighting dimensions based on previous user interactions, such as which results are selected by the user when presented with the search results.

In an example, the system may implement an offline (e.g., not real time) and an online (e.g., real time) division of processing. The offline component may include collection of geographic map layers including polygon definitions. The offline component may also include adding attributes that exist in other sources or layers, such as pollution, noise, crime, POI density, POI category density, among others to build the area index. These layers may be extracted from government sources, data vendors, news organizations, etc. The offline component may also extract area topics on layers based on reviews using topical modeling, such as Latent Dirichlet Allocation (LDA), or the like. Additionally, the offline component may track and integrate user specific interaction data based on historical interactions between the user and the system.

The online component integrates the offline work with a current user inquiry. For example, the online component receives a user query, such as "quiet hotels outside of London." The online component may then perform query extraction structuring. For example, the previous query may be structured as [POI_TYPE: hotel; LOCATION: London-UK; PROPOSITION_TYPE: exclude_polygon; ATTRIBUTE: quiet]. Based on the target location and the proposition type, the online component performs an area extraction from the area index. POI extraction follows in which POI that are relevant (e.g., contained within) to the area extraction are identified from the external entity search results. User feature extraction from historical search information of the user may also intersect the POI results to further remove POI that are unlikely to be desired by the user. The modified search results may be ranked and presented to the user.

Figure 4:
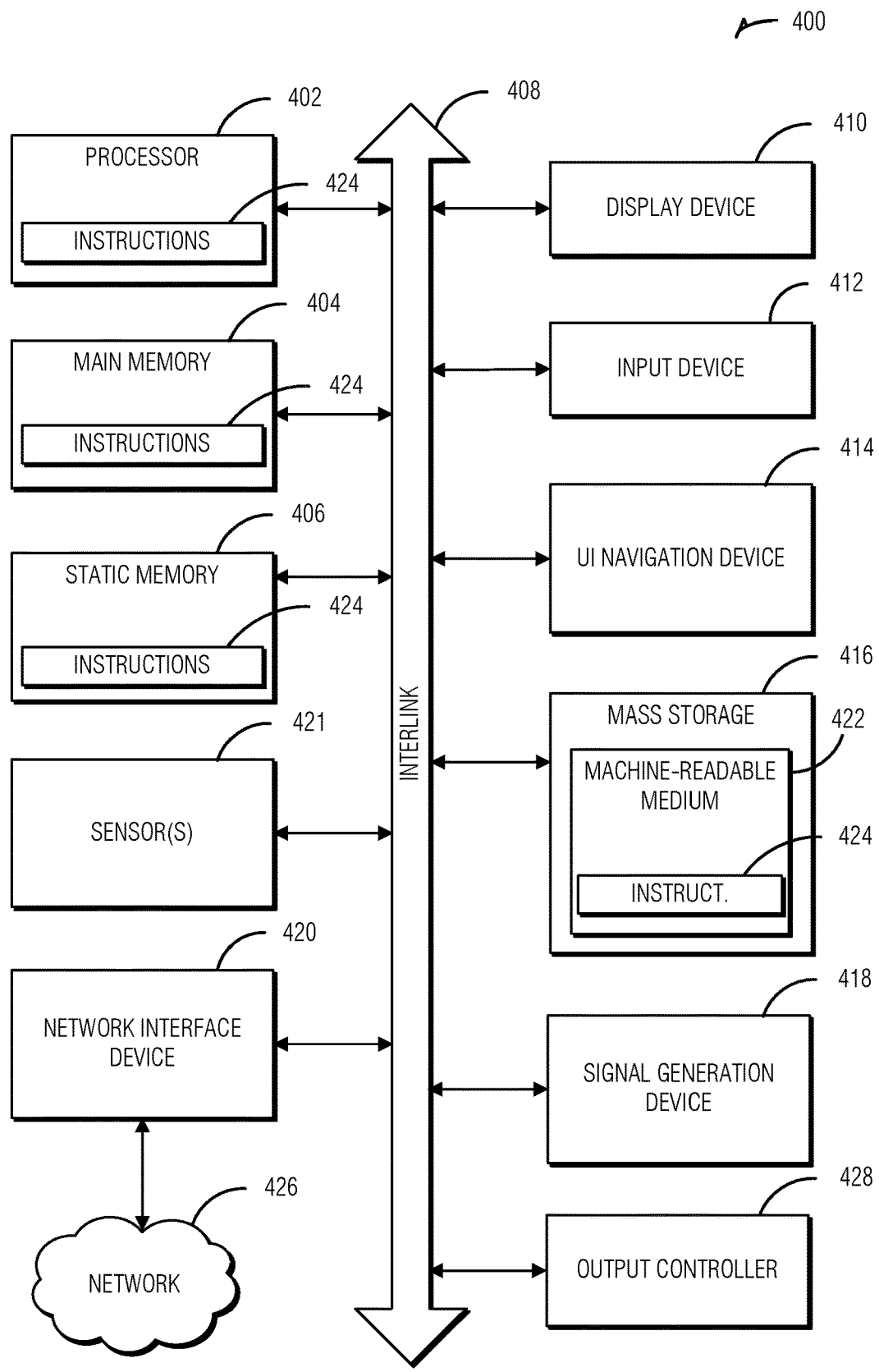
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

Figure 5:
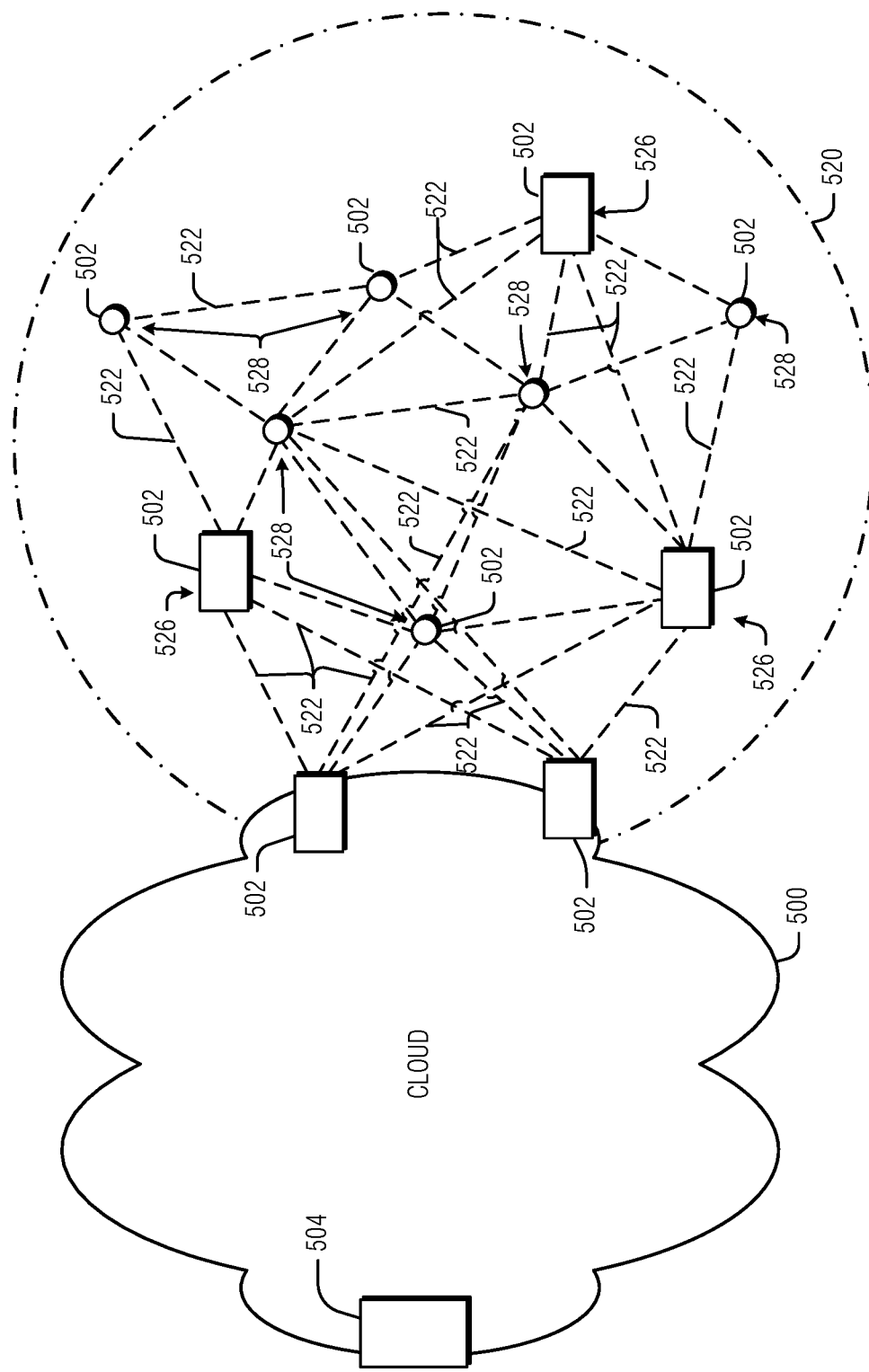
FIG. 5 illustrates a cloud and an IoT mesh network topology, according to an embodiment.

FIG. 5 is a drawing of a cloud computing network, or cloud 500, in communication with a mesh network of IoT devices 502, which may be termed a fog 520, operating at the edge of the cloud 500. To simplify the diagram, not every IoT devices 502 is labeled.

The fog 520 may be considered to be a massively interconnected network wherein a number of IoT devices 502 are in communications with each other, for example, by radio links 522. This may be performed using the open interconnect consortium (OIC) standard specification 5.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T.M.A.N.), among others.

Three types of IoT devices 502 are shown in this example, gateway/ICDs 524, ICDs 526, and IBDs 528, although any combinations of IoT devices 502 and functionality may be used. The gateway/ICDs 524 may be edge devices that provide communications between the cloud 500 and the fog 520, and may also function as charging and locating devices for the IBDs 528. The ICDs 526 may provide charging for IBDs 528 and may also locate the IBDs 528. The locations, charging alerts, battery alerts, and other data, or both may be passed along to the cloud 500 through the gateway/ICDs 524. As described herein, the IBDs 528 may provide power, location services, or both to other devices or items.

Communications from any IoT device 502 may be passed along the most convenient path between any of the IoT devices 502 to reach the gateways 524. In these networks, the number of interconnections provide substantial redundancy, allowing communications to be maintained, even with the loss of a number of IoT devices 502.

The fog 520 of these IoT devices 502 devices may be presented to devices in the cloud 500, such as a server 504, as a single device located at the edge of the cloud 500, e.g., a fog 520 device. In this example, the alerts coming from the fog 520 device may be sent without being identified as coming from a specific IoT device 502 within the fog 520. For example, an alert may indicate that an IBD 528 needs to be returned for charging and the location of the IBD 528, without identifying any specific ICD 526 that sent the alert.

In some examples, the IoT devices 502 may be configured using an imperative programming style, e.g., with each IoT device 502 having a specific function. However, the IoT devices 502 forming the fog 520 device may be configured in a declarative programming style, allowing the IoT devices 502 to reconfigure their operations and determine needed resources in response to conditions, queries, and device failures. For example, a query from a user located at a server 504 about the location of an IBD 528 may result in the fog 520 device selecting the IoT devices 502, such as particular ICDs 526, needed to answer the query. If the IBDs 528 are providing power to a device, sensors associated with the IBD 528, such as power demand, temperature, and the like, may be used in concert with sensors on the device, or other devices, to answer a query. In this example, IoT devices 502 in the fog 520 may select the sensors on particular IBDs 528 based on the query, such as adding data from power sensors or temperature sensors. Further, if some of the IoT devices 502 are not operational, for example, if an ICD 526 has failed, other IoT devices 502 in the fog 520 device may provide substitute, allowing locations to be determined.

ADDITIONAL NOTES & EXAMPLES

Example 1 is a system for search dimensionality expansion, the system comprising: a transceiver to: obtain a search result generated by an external entity, the search result including a set of geographic points of interest (POI); and transmit a modified search result to a user device; a search engine to retrieve a geographic segment from a geographic segment library, the geographic segment containing a member of the set of POI, the geographic segment defining a geographic area and a dimension set; and an integrator to modify the search result to create the modified search result that includes a member of the dimension set.

In Example 2, the subject matter of Example 1 optionally includes wherein members of the dimension set include at least one of a pollution index, a crime index, a population density, an injury rate, a noise index, a POI density, or population demographic.

In Example 3, the subject matter of any one or more of Examples 1-2 optionally include wherein a member of the dimension set includes a positional proposition.

In Example 4, the subject matter of any one or more of Examples 1-3 optionally include wherein to modify the search result includes the integrator to create a relationship entry between the search result and the geographic area.

In Example 5, the subject matter of any one or more of Examples 1-4 optionally include wherein to modify the search result includes the integrator to create a relationship entry for each member of the dimension set and the search result.

In Example 6, the subject matter of any one or more of Examples 1-5 optionally include wherein the transceiver is to: transmit a search interface to the user device; receive query parameters from the search interface, the query parameters selected based on user interactions with the search interface; and transmit external query parameters to the external entity.

In Example 7, the subject matter of Example 6 optionally includes wherein the query parameters include an identifier for the external entity.

In Example 8, the subject matter of Example 7 optionally includes wherein the search interface includes a recommendation for the external entity based on prior user interactions with the search interface.

In Example 9, the subject matter of any one or more of Examples 6-8 optionally include wherein the query parameters include a dimension selector.

In Example 10, the subject matter of Example 9 optionally includes wherein to search the geographic segment library includes the search engine to limit the search to geographic segments that have a dimension set member that conforms to the dimension selector.

In Example 11, the subject matter of any one or more of Examples 9-10 optionally include wherein to modify the search result includes the integrator to remove the member of the set of POI when the dimension set does not conform to the dimension selector.

In Example 12, the subject matter of any one or more of Examples 1-11 optionally include wherein the transceiver is to: obtain a source host definition including a corresponding dimension set; and transmit, periodically, a source query to a host identified by the source host definition; and wherein the search engine is to store a result from the source query in the dimension set for the geographic segment.

In Example 13, the subject matter of Example 12 optionally includes wherein the query result includes reviews within the geographic segment, and wherein the search engine is to: perform topic extraction on the reviews to create a topic set; and add members of the topic set to the dimension set.

Example 14 is a method for search dimensionality expansion, the method comprising: obtaining a search result generated by an external entity, the search result including a set of geographic points of interest (POI); retrieving a geographic segment from a geographic segment library, the geographic segment containing a member of the set of POI, the geographic segment defining a geographic area and a dimension set; modifying the search result to create a modified search result that includes a member of the dimension set; and transmitting the modified search result to a user device.

In Example 15, the subject matter of Example 14 optionally includes wherein members of the dimension set include at least one of a pollution index, a crime index, a population density, an injury rate, a noise index, a POI density, or a population demographic.

In Example 16, the subject matter of any one or more of Examples 14-15 optionally include wherein at least one member of the dimension set includes a positional proposition.

In Example 17, the subject matter of any one or more of Examples 14-16 optionally include wherein modifying the search result includes creating a relationship entry between the search result and the geographic area.

In Example 18, the subject matter of any one or more of Examples 14-17 optionally include wherein modifying the search result includes creating a relationship entry for each member of the dimension set and the search result.

In Example 19, the subject matter of any one or more of Examples 14-18 optionally include transmitting a search interface to the user device; receiving query parameters from the search interface, the query parameters selected based on user interactions with the search interface; parsing the query parameters to create external query parameters; and transmitting the external query parameters to the external entity.

In Example 20, the subject matter of Example 19 optionally includes wherein the query parameters include an identifier for the external entity.

In Example 21, the subject matter of Example 20 optionally includes wherein the search interface includes a recommendation for the external entity based on prior user interactions with the search interface.

In Example 22, the subject matter of any one or more of Examples 19-21 optionally include wherein the query parameters include a dimension selector.

In Example 23, the subject matter of Example 22 optionally includes wherein searching the geographic segment library includes limiting the search to geographic segments that have a dimension set member that conforms to the dimension selector.

In Example 24, the subject matter of any one or more of Examples 22-23 optionally include wherein modifying the search result includes removing the member of the set of POI when the dimension set does not conform to the dimension selector.

In Example 25, the subject matter of any one or more of Examples 14-24 optionally include obtaining a source host definition including a corresponding dimension set; transmitting, periodically, a source query to a host identified by the source host definition; and storing a result from the source query in the dimension set for the geographic segment.

In Example 26, the subject matter of Example 25 optionally includes wherein the query result includes reviews within the geographic segment, the method comprising: performing topic extraction on the reviews to create a topic set; and adding members of the topic set to the dimension set.

Example 27 is at least one machine readable medium including instructions that, when executed by a machine, cause the machine to perform any method of Examples 14-26.

Example 28 is a system comprising means to perform any method of Examples 14-26.

Example 29 is a system for search dimensionality expansion, the system comprising: means for obtaining a search result generated by an external entity, the search result including a set of geographic points of interest (POI); means for retrieving a geographic segment from a geographic segment library, the geographic segment containing a member of the set of POI, the geographic segment defining a geographic area and a dimension set; means for modifying the search result to create a modified search result that includes a member of the dimension set; and means for transmitting the modified search result to a user device.

In Example 30, the subject matter of Example 29 optionally includes wherein members of the dimension set include at least one of a pollution index, a crime index, a population density, an injury rate, a noise index, a POI density, or a population demographic.

In Example 31, the subject matter of any one or more of Examples 29-30 optionally include wherein at least one member of the dimension set includes a positional proposition.

In Example 32, the subject matter of any one or more of Examples 29-31 optionally include wherein the means for modifying the search result includes means for creating a relationship entry between the search result and the geographic area.

In Example 33, the subject matter of any one or more of Examples 29-32 optionally include wherein the means for modifying the search result includes means for creating a relationship entry for each member of the dimension set and the search result.

In Example 34, the subject matter of any one or more of Examples 29-33 optionally include means for transmitting a search interface to the user device; means for receiving query parameters from the search interface, the query parameters selected based on user interactions with the search interface; means for parsing the query parameters to create external query parameters; and means for transmitting the external query parameters to the external entity.

In Example 35, the subject matter of Example 34 optionally includes wherein the query parameters include an identifier for the external entity.

In Example 36, the subject matter of Example 35 optionally includes wherein the search interface includes a recommendation for the external entity based on prior user interactions with the search interface.

In Example 37, the subject matter of any one or more of Examples 34-36 optionally include wherein the query parameters include a dimension selector.

In Example 38, the subject matter of Example 37 optionally includes wherein the means for searching the geographic segment library includes means for limiting the search to geographic segments that have a dimension set member that conforms to the dimension selector.

In Example 39, the subject matter of any one or more of Examples 37-38 optionally include wherein the means for modifying the search result includes means for removing the member of the set of POI when the dimension set does not conform to the dimension selector.

In Example 40, the subject matter of any one or more of Examples 29-39 optionally include means for obtaining a source host definition including a corresponding dimension set; means for transmitting, periodically, a source query to a host identified by the source host definition; and means for storing a result from the source query in the dimension set for the geographic segment.

In Example 41, the subject matter of Example 40 optionally includes wherein the query result includes reviews within the geographic segment, the system comprising: means for performing topic extraction on the reviews to create a topic set; and means for adding members of the topic set to the dimension set.

Example 42 is at least machine readable medium including instructions for search dimensionality expansion, the instructions, when executed by a machine, cause the machine to: obtain a search result generated by an external entity, the search result including a set of geographic points of interest (POI); retrieve a geographic segment from a geographic segment library, the geographic segment containing a member of the set of POI, the geographic segment defining a geographic area and a dimension set; modify the search result to create a modified search result that includes a member of the dimension set; and transmit the modified search result to a user device.

In Example 43, the subject matter of Example 42 optionally includes wherein members of the dimension set include at least one of a pollution index, a crime index, a population density, an injury rate, a noise index, a POI density, or a population demographic.

In Example 44, the subject matter of any one or more of Examples 42-43 optionally include wherein at least one member of the dimension set includes a positional proposition.

In Example 45, the subject matter of any one or more of Examples 42-44 optionally include wherein to modify the search result includes creating a relationship entry between the search result and the geographic area.

In Example 46, the subject matter of any one or more of Examples 42-45 optionally include wherein to modify the search result includes creating a relationship entry for each member of the dimension set and the search result.

In Example 47, the subject matter of any one or more of Examples 42-46 optionally include wherein the instructions cause the machine to: transmit a search interface to the user device; receive query parameters from the search interface, the query parameters selected based on user interactions with the search interface; parse the query parameters to create external query parameters; and transmit the external query parameters to the external entity.

In Example 48, the subject matter of Example 47 optionally includes wherein the query parameters include an identifier for the external entity.

In Example 49, the subject matter of Example 48 optionally includes wherein the search interface includes a recommendation for the external entity based on prior user interactions with the search interface.

In Example 50, the subject matter of any one or more of Examples 47-49 optionally include wherein the query parameters include a dimension selector.

In Example 51, the subject matter of Example 50 optionally includes wherein to search the geographic segment library includes limiting the search to geographic segments that have a dimension set member that conforms to the dimension selector.

In Example 52, the subject matter of any one or more of Examples 50-51 optionally include wherein to modify the search result includes removing the member of the set of POI when the dimension set does not conform to the dimension selector.

In Example 53, the subject matter of any one or more of Examples 42-52 optionally include wherein the instructions cause the machine to: obtain a source host definition including a corresponding dimension set; transmit, periodically, a source query to a host identified by the source host definition; and store a result from the source query in the dimension set for the geographic segment.

In Example 54, the subject matter of Example 53 optionally includes wherein the query result includes reviews within the geographic segment, wherein the instructions cause the machine to: perform topic extraction on the reviews to create a topic set; and add members of the topic set to the dimension set.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for search dimensionality expansion, the system comprising:
    a transceiver to:
        obtain a search result generated by an external entity, the search result including a set of geographic points of interest (POI); and
        transmit a modified search result to a user device;
    a search engine to retrieve a geographic segment from a geographic segment library, the geographic segment containing a member of the set of POI, the geographic segment defining a geographic area and a dimension set; and
    an integrator to modify the search result to create the modified search result that includes a member of the dimension set, wherein to modify the search result includes the integrator to create a relationship entry for each member of the dimension set and the search result, wherein the relationship entry is at least one of a foreign key to the dimension set or the dimension set data.

2. The system of claim 1, wherein members of the dimension set include at least one of a pollution index, a crime index, a population density, an injury rate, a noise index, a POI density, or population demographic.

3. The system of claim 1, wherein a member of the dimension set includes a positional proposition.

4. The system of claim 1, wherein to modify the search result includes the integrator to create a relationship entry between the search result and the geographic area.

5. The system of claim 1, wherein the transceiver is to:
    transmit a search interface to the user device;
    receive query parameters from the search interface, the query parameters selected based on user interactions with the search interface; and
    transmit external query parameters to the external entity.

6. The system of claim 5, wherein the query parameters include an identifier for the external entity.

7. The system of claim 5, wherein the query parameters include a dimension selector.

8. The system of claim 1, wherein the transceiver is to:
    obtain a source host definition including a corresponding dimension set; and
    transmit, periodically, a source query to a host identified by the source host definition; and
    wherein the search engine is to store a result from the source query in the dimension set for the geographic segment.

9. A method for search dimensionality expansion, the method comprising:
    obtaining a search result generated by an external entity, the search result including a set of geographic points of interest (POI);
    retrieving a geographic segment from a geographic segment library, the geographic segment containing a member of the set of POI, the geographic segment defining a geographic area and a dimension set;
    modifying the search result to create a modified search result that includes a member of the dimension set, wherein modifying the search result includes creating a relationship entry between the search result and the geographic area, wherein the relationship entry is at least one of a foreign key to the dimension set or the dimension set data; and
    transmitting the modified search result to a user device.

10. The method of claim 9, wherein members of the dimension set include at least one of a pollution index, a crime index, a population density, an injury rate, a noise index, a POI density, or a population demographic.

11. The method of claim 9, wherein at least one member of the dimension set includes a positional proposition.

12. The method of claim 9, wherein modifying the search result includes creating a relationship entry for each member of the dimension set and the search result.

13. The method of claim 9, comprising:
    transmitting a search interface to the user device;
    receiving query parameters from the search interface, the query parameters selected based on user interactions with the search interface;
    parsing the query parameters to create external query parameters; and
    transmitting the external query parameters to the external entity.

14. The method of claim 13, wherein the query parameters include an identifier for the external entity.

15. The method of claim 13, wherein the query parameters include a dimension selector.

16. The method of claim 9, comprising:
    obtaining a source host definition including a corresponding dimension set;
    transmitting, periodically, a source query to a host identified by the source host definition; and
    storing a result from the source query in the dimension set for the geographic segment.

17. At least one non-transitory machine readable medium including instructions for search dimensionality expansion, the instructions, when executed by a machine, cause the machine to:
    obtain a search result generated by an external entity, the search result including a set of geographic points of interest (POI);
    retrieve a geographic segment from a geographic segment library, the geographic segment containing a member of the set of POI, the geographic segment defining a geographic area and a dimension set;
    modify the search result to create a modified search result that includes a member of the dimension set, wherein to modify the search result includes creating a relationship entry for each member of the dimension set and the search result, wherein the relationship entry is at least one of a foreign key to the dimension set or the dimension set data; and transmit the modified search result to a user device.

18. The at least one non-transitory machine readable medium of claim 17, wherein members of the dimension set include at least one of a pollution index, a crime index, a population density, an injury rate, a noise index, a POI density, or a population demographic.

19. The at least one non-transitory machine readable medium of claim 17, wherein at least one member of the dimension set includes a positional proposition.

20. The at least one non-transitory machine readable medium of claim 17, wherein to modify the search result includes creating a relationship entry between the search result and the geographic area.

21. The at least one non-transitory machine readable medium of claim 17, wherein the instructions cause the machine to:

transmit a search interface to the user device;

receive query parameters from the search interface, the query parameters selected based on user interactions with the search interface;

parse the query parameters to create external query parameters; and transmit the external query parameters to the external entity.

22. The at least one non-transitory machine readable medium of claim 21, wherein the query parameters include an identifier for the external entity.

23. The at least one non-transitory machine readable medium of claim 21, wherein the query parameters include a dimension selector.

24. The at least one non-transitory machine readable medium of claim 17, wherein the instructions cause the machine to:

obtain a source host definition including a corresponding dimension set;

transmit, periodically, a source query to a host identified by the source host definition; and store a result from the source query in the dimension set for the geographic segment.

* * * * *